United States Patent
Patel

(10) Patent No.: US 10,225,188 B2
(45) Date of Patent: *Mar. 5, 2019

(54) ROUTING MESSAGES BETWEEN VIRTUAL NETWORKS

(71) Applicant: MICROSOFT TECHNOLOGY LICENSING, LLC, Redmond, WA (US)

(72) Inventor: Parveen Patel, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,412

(22) Filed: Mar. 12, 2018

(65) Prior Publication Data

US 2018/0212873 A1    Jul. 26, 2018

Related U.S. Application Data

(63) Continuation of application No. 15/634,872, filed on Jun. 27, 2017, now Pat. No. 9,942,143, which is a
(Continued)

(51) Int. Cl.
*H04L 12/741* (2013.01)
*H04L 29/12* (2006.01)
*H04L 12/46* (2006.01)

(52) U.S. Cl.
CPC .......... *H04L 45/74* (2013.01); *H04L 12/4641* (2013.01); *H04L 61/106* (2013.01); *H04L 61/1511* (2013.01)

(58) Field of Classification Search
CPC ... H04L 45/74; H04L 61/106; H04L 12/4641; H04L 61/1511
See application file for complete search history.

(56) References Cited

U.S. PATENT DOCUMENTS

| 5,845,203 A | 12/1998 | LaDue |
| 6,097,719 A | 8/2000 | Benash et al. |

(Continued)

FOREIGN PATENT DOCUMENTS

| CN | 102047245 A | 5/2011 |
| CN | 102948132 A | 2/2013 |

OTHER PUBLICATIONS

"Enabling Service Chaining on Cisco Nexus 1000V Series", Retrieved From <<http://web.archive.org/web/20130724064218/http://www.cisco.com/en/US/prod/collateral/switches/ps9441/ps9902/white_paper_c11-716028.pdf>>, Jul. 18, 2013, 25 Pages.
(Continued)

*Primary Examiner* — Gbemileke J Onamuti
(74) *Attorney, Agent, or Firm* — Workman Nydegger

(57) ABSTRACT

Routing messages between virtual networks using a mapping of virtual addresses from one virtual network to a virtual address of the other virtual network. Each virtual network has a valid set of virtual addresses, some of which being assigned to virtual nodes within the corresponding network. When a virtual network identifies a message to be sent, it identifies a destination for the message. Some destinations may be within the same virtual network and thus may be routed to virtual nodes within the virtual network. Other destinations may instead be mapped to a virtual address of another virtual network. In that case, routing information may also be obtained and the message may be dispatched to the virtual address of the other virtual network. This may be performed without the need for a gateway, which publishes a public address that is globally unique.

20 Claims, 4 Drawing Sheets

Related U.S. Application Data continuation of application No. 14/150,584, filed on Jan. 8, 2014, now Pat. No. 9,712,438.

(56) References Cited

U.S. PATENT DOCUMENTS

| | | |
|---|---|---|
| 8,046,480 B2 | 10/2011 | Cohn |
| 8,166,205 B2 | 4/2012 | Farinacci et al. |
| 8,370,834 B2 | 2/2013 | Edwards et al. |
| 8,612,576 B1 | 12/2013 | Brandwine et al. |
| 2002/0186698 A1 | 12/2002 | Ceniza |
| 2003/0074472 A1 | 4/2003 | Lucco et al. |
| 2003/0200307 A1 | 10/2003 | Raju et al. |
| 2005/0165901 A1 | 7/2005 | Bu et al. |
| 2006/0036719 A1 | 2/2006 | Bodin et al. |
| 2006/0098668 A1 | 5/2006 | Dona |
| 2007/0028002 A1 | 2/2007 | McCanne |
| 2007/0153782 A1 | 7/2007 | Fletcher et al. |
| 2010/0246443 A1 | 9/2010 | Cohn et al. |
| 2011/0320821 A1 | 12/2011 | Alkhatib et al. |
| 2013/0054789 A1 | 2/2013 | Bajamahal |

OTHER PUBLICATIONS

"Final Office Action Issued in U.S. Appl. No. 14/150,584", dated Sep. 30, 2016, 36 Pages.
"Non-Final Office Action Issued in U.S. Appl. No. 14/150,584", dated Apr. 20, 2016, 31 Pages.
"Notice of Allowance Issued in U.S. Appl. No. 14/150,584", dated Mar. 10, 2017, 8 Pages.
"Notice of Allowance Issued in U.S. Appl. No. 14/150,584", dated Jun. 7, 2017, 2 Pages.
"Office Action Issued in European Patent Application No. 14827684.3", dated Apr. 18, 2017, 9 Pages.
"Non-final Office Action Issued in U.S Appl. No. 15/634,872", dated Aug. 25, 2017, 18 Pages.
"Notice of Allowance Issued in U.S Appl. No. 15/634,872", dated Nov. 29, 2017, 9 Pages.
Berners-Lee, et al., "Uniform Resource Identifier (URI): Generic Syntax", In Network Working Group Request for Comments: 3986, Jan. 1, 2005, 61 Pages.
Burtsev, et al., "Fido: Fast Inter-Virtual-Machine Communication for Enterprise Appliances", In Proceedings of the Conference on USENIX Annual Technical Conference, Jun. 14, 2009,13 Pages.
Carle, et al., "Kapitel 3: Vermitt;ungsschicht: Grundlagen Rechnernetze und Verteilte Systeme SoSe 2012", In Lehrstuhl fur Netzarchitekturen und Netzdienste, Fakultat fur Informatik, Technishe Universitat Munchen, Jul. 1, 2012, 135 Pages.
"International Preliminary Report on Patentability Issued in PCT Application No. PCT/US2014/072305", dated Feb. 16, 2016, 10 Pages.
"International Search Report and Written Opinion Issued in PCT Application No. PCT/US2014/072305", dated Apr. 8, 2015, 13 Pages.
"Second Written Opinion Issued in PCT Application No. PCT/US2014/072305", dated Nov. 26, 2015, 9 Pages.
Spohn, et al., "Exploiting Relative Addressing and Virtual Overlays in Ad Hoc Networks with Bandwidth and Processing Constraints", In Proceedings of the International Conference on Wireless Network, Jun. 23, 2003, 7 Pages.
Srisuresh, et al., "DNS Extensions to Network Address Translators (DNS_ALG)", In Network working Group Request for comments: 2694, Sep. 1, 1999, 30 Pages.
Zhu, et al., "oEvolve: Toward Evolutionary Overlay Topologies for High-Bandwidth Data Dissemination", In IEEE Journal on Selected Areas in Communications, vol. 22, Issue 7, Sep. 2004, 15 Pages.
"Office Action and Search Report Issued in Chinese Patent Application No. 201480072700.X", dated Sep. 5, 2018, 14 Pages.

ROUTING MESSAGES BETWEEN VIRTUAL NETWORKS

CROSS-REFERENCE TO RELATED APPLICATIONS

This application is a continuation of U.S. patent application Ser. No. 15/634,872 filed on Jun. 27, 2017 and entitled "ROUTING MESSAGES BETWEEN VIRTUAL NETWORKS," which is a continuation of U.S. patent application Ser. No. 14/150,584 filed on Jan. 8, 2014 and entitled "ROUTING MESSAGES BETWEEN VIRTUAL NETWORKS." The entire contents of each of the foregoing applications are expressly incorporated by reference herein in their entireties.

BACKGROUND

In any given physical network, each node is provided with an address called an Internet Protocol (or "IP") address. The address of each node is published within the domain of the physical network so that nodes may be properly identified, and network messages (e.g., IP packets) may be properly routed within the physical network. The physical nodes correspond to actual physical components such as servers, network interface cards, switches, and the like.

One or more virtual networks may be overlaid over a physical network. In virtual networks, however, the nodes (called herein "virtual nodes") are components that are capable of processing information, but may not be confined to any physical boundary. For instance, the node might be a software component, application, virtual machine, virtual switch, hypervisor, or any other component capable of sending and/or receiving network messages.

A virtual network layer that operates in the physical network abstracts the nature of the underlying physical network to the virtual nodes. Specifically, the virtual network layer keeps track of an address (i.e., a virtual address) assigned to each virtual node, and correlates the virtual address with an applicable physical address for the physical node (e.g., a switch).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein refer to routing messages between virtual networks using a mapping of a virtual address from one virtual network to a virtual address of the other virtual network. Each virtual network has a valid set of virtual addresses, some of which being assigned to virtual nodes within the corresponding virtual network. In one embodiment, the virtual networks overly the same physical network. When a virtual network identifies a message to be sent, it identifies a destination for the message. Some destinations may be within the same virtual network and thus may be routed to virtual nodes within the virtual network.

Other destinations may instead be mapped to virtual addresses of another virtual network. In that case, routing information may also be obtained and the message may be dispatched to the virtual address of the other virtual network. This may be performed without the need for a gateway, which publishes a public address that is globally unique. Instead, the logic within the virtual network itself accomplishes the messaging between virtual networks.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein related to the routing of messages between virtual networks using a mapping of virtual addresses from one virtual network to virtual addresses of the other virtual network. Each virtual network has a valid set of virtual addresses, some of which being assigned to virtual nodes within the corresponding network. In one embodiment, the virtual networks overly the same physical network. When a virtual network identifies a message to be sent, it identifies a destination for the message. Some destination virtual addresses may be within the same virtual network and thus may be routed to virtual nodes within the virtual network.

Other destinations virtual address may instead be mapped to a virtual address of another virtual network. In that case, routing information may also be obtained and the message may be dispatched to the virtual address of the other virtual network. This may be performed without the need for a gateway, which publishes a public address that is globally unique. Instead, the logic within the virtual network itself accomplished the messaging between virtual networks.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

Figure 1:
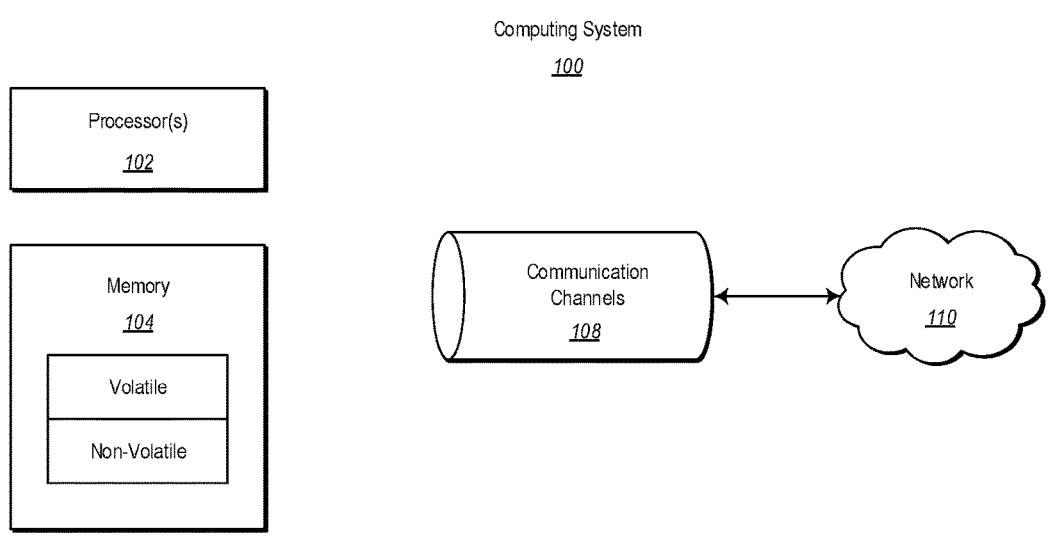
FIG. 1 illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special-purpose or general-purpose computer system that includes computer hardware, such as, for example, one or more processors and system memory, as discussed in greater detail below. The system memory may be included within the overall memory 104. The system memory may also be referred to as "main memory", and includes memory locations that are addressable by the at least one processing unit 102 over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
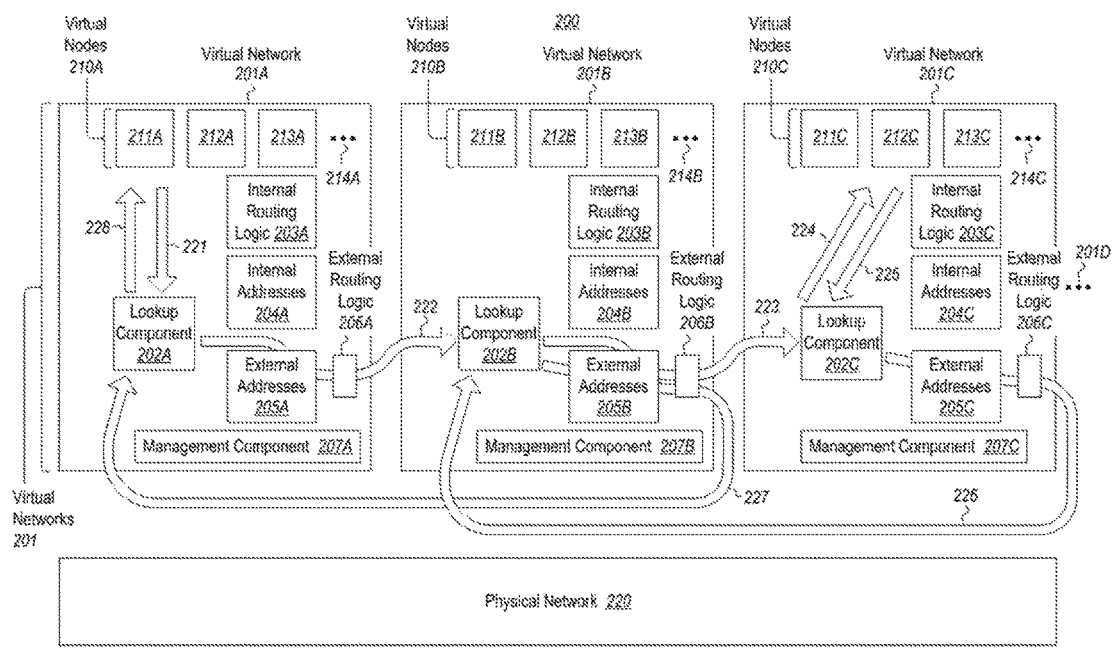
FIG. 2 illustrates a network environment that includes multiple virtual networks overlying a physical network and communicating with each other.

FIG. 2 illustrates a network environment 200 that includes multiple virtual networks 201. In the illustrated embodiment, there are three virtual networks illustrated including virtual network 201A, virtual network 201B and virtual network 201C. However, the ellipses 201D symbolically represents that there may be any multiple number (two or more) virtual networks 201 within the network environment 200. In the illustrated embodiment, the virtual networks 201 each operate over a physical network 220.

Each virtual network includes one or more virtual nodes. A "virtual node" is a component (such as a software module, object, function, method, collections of the same, or combinations thereof) that is capable of processing information, but may not be confined to any physical boundary. For instance, the node might be a software component, application, virtual machine, virtual switch, hypervisor, or any other component capable of sending and/or receiving network messages.

A virtual network may include any number of virtual nodes, but in the illustrated example, each virtual network is illustrated as including three virtual nodes. For instance, virtual network 201A includes virtual nodes 210A, which include virtual nodes 211A, 212A and 213A. Likewise, virtual network 201B includes virtual nodes 210B, which include virtual nodes 211B, 212B and 213B. Finally, virtual network 201C includes virtual nodes 210C, which include virtual nodes 211C, 212C and 213C. The ellipses 214A, 214B and 214C symbolically represent that there may be any number of virtual nodes within any given virtual network, and the number of virtual nodes in any given virtual network may change as virtual nodes are terminated and created over time.

In the illustrated embodiment, each virtual network includes further components that allow network messages to be routed between virtual nodes including between virtual networks.

For instance, virtual network 201A includes a lookup component 202A that identifies a destination virtual address for a message that is being transmitted by one of the virtual nodes in the virtual network 201A or that is in transmission from another virtual node in another virtual network (e.g., virtual network 201B or virtual network 201C).

The virtual network 201A also includes internal routing logic 203A that is configured to route within the virtual network 201A any messages that have a destination virtual address corresponding to any of the internal virtual nodes 210A. The virtual network 201A also includes an internal address routing information 204A that identifies the virtual addresses for each of the virtual nodes (e.g., virtual nodes 211A, 212A and 213A) within the virtual network 201A, and any routing information used to route the message to each virtual node. For instance, there might be a record that contains such routing information for each virtual address of the virtual nodes 210A. The internal routing logic 203A may use the internal address routing information 204A (e.g., the record corresponding to the destination virtual address) to identify the internal virtual node that is the destination of the message, and route the message to that internal virtual node.

The virtual network 201A also includes external routing logic 206A that is configured to route messages that are not destined for the virtual network 201A. The virtual network 201A also includes an external address routing information 205A that correspond to another of virtual addresses that 1) are valid virtual addresses for the virtual network 201A, but which 2) are each mapped to a valid address in a corresponding external virtual network 201B or 201C. For instance, there might be a record that contains such routing information for each of multiple external nodes that any of the virtual nodes 210A within the virtual network 201A might communicate with.

The external routing logic 206A may use the external address routing information 205A (e.g., a record corresponding to the destination virtual address) to identify a mapped virtual address corresponding to one of the virtual nodes in the other virtual networks 201B and 201C. The external routing logic 206A may also use the external routing information 205A (e.g., the record corresponding to the destination virtual address) to route the message over the physical network 220 to the internal routing logic of the next virtual network that handles the message (e.g., the internal routing logic 202B of the virtual network 201B if the mapped virtual address is within the virtual network 201B, or internal routing logic 202C of the virtual network 201C if the mapped virtual address is within the virtual network 201C). In one embodiment, the lookup component and the external routing logic may be replaced by a Domain Name Server (DNS) server, which is equipped to return the mapped virtual address given a name (e.g., uniform resource locator) of the destination.

Note that the next virtual network to handle the message may be the virtual network in which the destination virtual node is operating, or may simply represent an intermediary point as the message passes from one virtual network to the next. Thus, the virtual networks 201B and 201C are shown as including similar components to that of the virtual network 201A. For instance, the virtual network 201B includes lookup component 202B, internal routing logic 203B, internal address routing information 204B, external address routing information 205B, and the external routing logic 206B, which may perform the same operations with respect to the virtual network 201B as the operations described above as being performed by corresponding components 202A, 203A, 204A, 205A and 206A for the first virtual network 201.

Accordingly, messages received by the lookup component 202B of the second virtual network 201B may likewise, depending on whether there is an internal virtual node addressed by the received message, either 1) internally route the message to one of the virtual nodes 210B of the virtual network 201B using the internal routing logic 203B and the internal address routing information 204B or 2) externally route the message to one of the virtual nodes of the other virtual networks 201A or 201C using the external routing logic 206B and the external address routing information 205B.

Likewise, messages received by the lookup component 202C of the third virtual network 201C may, depending on whether there is an internal virtual node addressed by the received message, either 1) internally route the message to one of the virtual nodes 210C of the virtual network 201C using the internal routing logic 203C and the internal address routing information 204C or 2) externally route the message to one of the virtual nodes of the other virtual networks 201A or 201B using the external routing logic 206C and the external address routing information 205C.

Thus, a message may be conveyed between virtual nodes within the same virtual network, or may be conveyed between virtual nodes in different virtual networks. Furthermore, for those messages conveyed between virtual nodes in different virtual networks, such messages may be transferred using zero or more intermediary virtual networks.

Each of the virtual networks 201A, 201B and 201C includes a corresponding management component 207A, 207B and 207C respectively. The management component 207A may be used to configure the internal address routing information 204A and the external address routing information 205A. For instance, by altering the internal routing information, virtual nodes may be created, terminated, or configured within the corresponding virtual network. By altering the external routing information, communications may be enabled to one or more external virtual nodes. Similarly, the management component 207B may be used to configure the internal address routing information 204B and the external address routing information 205B. Also, the management component 207C may be used to configure the internal address routing information 204C and the external address routing information 205C.

In one embodiment, smooth two way channels may be created by adding further routing information associated with the return path into the corresponding record of the external address routing information. For instance, consider a situation in which a message is transmitted from a first particular virtual node in a first particular virtual network to a second particular virtual node in a second particular virtual network.

As previously described, the lookup component of the first particular virtual network receives the message from the first particular virtual node, and verifies that the destination virtual address corresponds to the external address routing information. The external routing logic of the first particular virtual network uses the mapped virtual address corresponding to the second particular virtual node to dispatch the message. However, before doing so, the record also may include a return virtual address corresponding to the mapped virtual address. The return virtual address is a valid virtual address of the second particular virtual network.

Prior to dispatching the message to the mapped virtual address corresponding to the second particular virtual node, the external routing logic of the first particular virtual network modifies the message so that replies to the message are routed to the return virtual address. Likewise, the external address routing information of the second particular virtual network is likewise altered so that message destined for the return virtual address are mapped to the virtual address of the first particular virtual node. This enables two way communications between two virtual nodes in different virtual networks by modifying the external address routing information in each of the two virtual networks. This has been accomplished without having to publish a public globally unique address. Thus, a gateway need not be used to communicate between different virtual networks.

Figure 3:
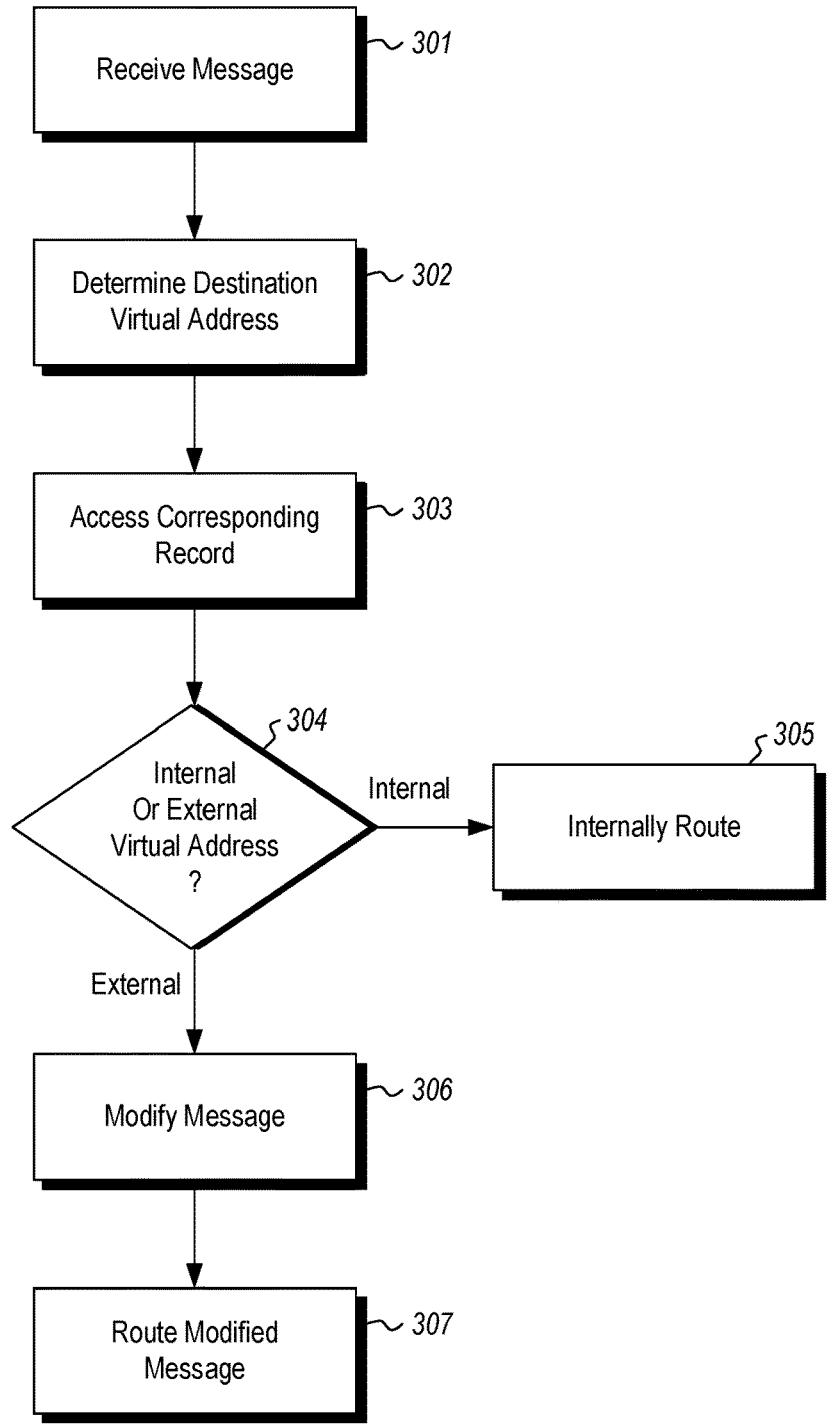
FIG. 3 illustrates a flowchart of a method for routing a message between virtual networks in accordance with the principles described herein.

FIG. 3 illustrates a flowchart of a method 300 for routing a message from a first particular virtual network (e.g., virtual network 201A in FIG. 2) to a second particular virtual network (e.g., virtual network 201B in FIG. 2). As the method 300 may be performed in the context of the network environment 200 of FIG. 2, the method 300 of FIG. 3 will be described with frequent reference to the network environment 200 of FIG. 2. In particular, in this example, a message is sent from virtual node 211A to the virtual node 212C via the second virtual network 201B (as represented by four arrows 221 through 224), and a response is sent back also via the second virtual network 201B (as represented by four arrows 225 through 228).

In this example two way communication, the method 300 will be performed six times. The first instance of method 300 communicates the message from the source virtual node 211A in the first virtual network 201A to the second virtual network 201B (see arrows 221 and 222). The second instance of the method 300 communicates the message from the second virtual network to the target virtual network 201C (see arrow 223). The third instance of the method 300 communicates the message to the target virtual node 212C in the target virtual network 201C (see arrow 224).

The fourth instance of the method 300 communicates the reply from the target virtual node 212C in the third virtual network 201C to the second virtual network 201B (see arrows 225 and 226). The fifth instance of the method 300 communicates the reply from the second virtual network 201B to the source virtual network 201A (see arrow 227). The sixth and final instance of the method 300 is performed to communicate the reply from to the source virtual node 211A in the source virtual network 201A (as represented by the arrow 228).

The first instance of the performance of the method 300 will now be described with respect to FIG. 2 and arrows 221 and 222. The virtual network that performs the method (virtual network 201A in this first instance of method 300) receives a message to be delivered (act 301). This receiving of the message is performed by the lookup component in each virtual network, and in the general case could include receiving the message from the source virtual node that created the message, or could include receiving the message from another virtual network. In the case of the first instance of method 300, the lookup component 202A of the first virtual network 201A receives the message (as represented by arrow 221) from the source virtual node 211A.

Figure 4A:
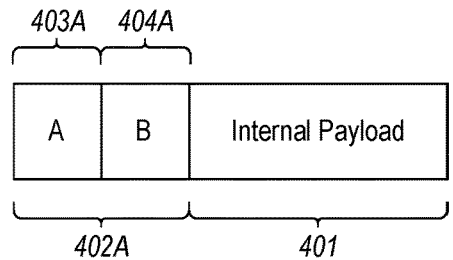
FIG. 4A abstractly illustrates an original message used in the example of FIG. 3, and which includes a payload and a header.

The virtual network then identifies the destination virtual address in the message (act 302). This destination virtual address is not necessarily, and is almost surely not, the same address as the virtual address of the target virtual node in the target virtual network. However, the destination virtual address expressed in the message at this point is a valid virtual address amongst the set of valid virtual addresses assigned to the virtual network. For instance, in the case of arrow 221, the message will have a destination virtual address that is one of the valid virtual addresses of the first virtual network 201A. For instance, an example of the message at this point is abstractly represented in FIG. 4A. The message 400A includes a payload 401A and a header 402A, with the header including a source virtual address 403A (symbolized by "A") and a destination virtual address 404A (symbolized as "B"). In this example, the lookup component 202A determines that the destination virtual address is "B" (which might abstractly represent an IP address). The other addresses "A", "C", "D", "E", and "F" might likewise symbolize IP addresses.

The virtual network then accesses a record associated with the destination virtual address in the virtual network (act 303). For instance, the lookup component 202A of the first virtual network 201A might access internal address routing information 204A and/or external address routing information 205A to access a record corresponding to destination address "B".

The virtual network then determines whether the destination virtual address is assigned to a virtual node within the same virtual network ("Internal" in decision block 304), or whether the destination virtual address is mapped to a virtual address associated with another virtual network ("External" in decision block 304). For instance, in FIG. 2, if the record was in the internal address routing information 204A, then the destination virtual address is assigned to a virtual node within the same virtual network ("Internal" in decision block 304). If the record was in the external address routing information 205A, then the destination virtual address is mapped to a virtual address in another virtual network ("External" in decision block 304). The mapped virtual address is a valid virtual address of the next virtual network.

If the destination virtual address is an internal virtual address ("Internal" in decision block 304), then the message is routed to the virtual node internal to the virtual network (act 305) using potentially information included within the record corresponding to the destination virtual address. For instance, this may be accomplished in FIG. 2 using the internal routing logic 203A.

However, if the destination virtual address be is mapped to a virtual address of another virtual network ("External" in decision block 304), the message is modified (act 306) so as to be addressed to the mapped virtual address in the next virtual network. For instance, in the example of FIG. 2, suppose that virtual address "D" is a valid virtual address in the second virtual network 201B, the message might be encapsulated with another header that has a destination virtual address of "D". Also, to facilitate two way communications, the message is also modified (as part of act 306) such that when the other virtual network handles a reply to the message, the reply is sent to a valid virtual address of the next virtual network.

Figure 4B:
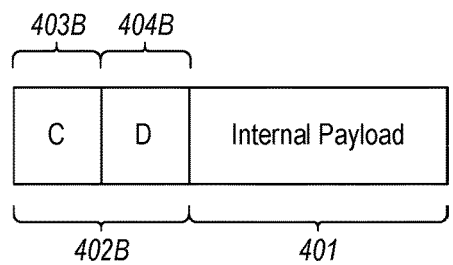
FIG. 4B abstractly illustrates a first encapsulated message that encapsulates the original message of FIG. 4A with a first encapsulating header.

For instance, in the example of FIG. 2, suppose that virtual address "C" is a valid virtual address in the second virtual network 201B. In that case, the encapsulating header might also include a source virtual address of "C". FIG. 4B illustrates an example of the encapsulated message 400B including an encapsulated payload 401B that represents the entire message 400A, and which includes an encapsulating header 402B that includes a source virtual address 403B (symbolized as "C") and a destination virtual address 404B (symbolized as "D").

The virtual network then routes the modified message towards the destination virtual address of the modified virtual address (act 307). The record associated with the original destination virtual address may include routing information to assist with this routing. For instance, in the example of FIG. 2, the external routing logic 206A may use the record associated with destination virtual address "B" to route the message (as represented by arrow 222) the message over the physical network 220 towards the destination virtual address "D" that is a valid virtual address of the second virtual network 201B.

Note that none, one or both of the virtual addresses "C" and "D" may also have been valid virtual addresses for the first virtual network 201A as well. However, communication as described herein may still be accomplished so long as the virtual addresses "C" and "D" were not assigned to a virtual node in the first virtual network 201A.

Outside of the example of FIG. 2, the first virtual network 201A may use the method 300 any number of times to send messages to the second virtual network 201B. Furthermore, the first virtual network 201B may use the method 300 any number of times to send messages to the third virtual network 201C even without the use of the second virtual network as an intermediary, as long as routing information exists for such a direct transmission within the external address routing information 205A.

This completes the first of six instances of the method 300 for the example, thereby describing how the communications associated with arrows 221 and arrow 222 may be performed.

The second instance of the performance of the method 300 will now be described with respect to FIG. 2 and arrow 223. In this case, the second virtual network 201B performs the method 300. The lookup component 202B receives the message to be delivered (act 301) as represented by arrow 222. The lookup component 202B then identifies the destination virtual address as virtual address "D" (act 302), a valid virtual address of the second virtual network 201B. The lookup component 202B then accesses a record associated with the destination virtual address "D" (act 303). In this case, the lookup component 202B finds a record within the external routing information ("External" in decision block 304), which record includes two mapped virtual addresses "E" and "F", both valid virtual addresses of the third virtual network 201C.

Figure 4C:
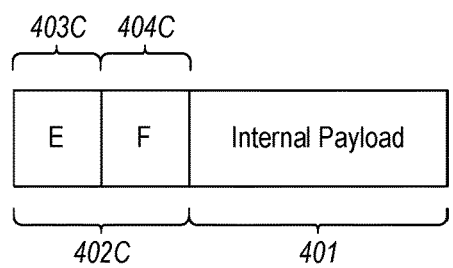
FIG. 4C abstractly illustrates a second encapsulated message that encapsulates the first encapsulated message of FIG. 4B with a second encapsulating header.

The message is again modified (e.g., encapsulated) with source virtual address "E" and the destination virtual address "F". FIG. 4C illustrates an example of the doubly encapsulated message 400C including a payload 401C that represents the entire message 400B, and which includes a second encapsulating header 402C that includes a source virtual address 403C (symbolized as "E") and a destination virtual address 404C (symbolized as "F"). The external routing logic 206B then routes the modified message (as represented by arrow 223) over the physical network 220 towards the destination virtual address "F" that is a valid virtual address of the third virtual network 201C. This completes the second of six instances of the method 300 for the example, thereby describing how the communications associated with arrow 223 may be performed.

The third instance of the performance of the method 300 will now be described with respect to FIG. 2 and arrow 224. In this case, the third virtual network 201C performs the method 300. The lookup component 202C receives the message to be delivered (act 301) as represented by arrow 223. The lookup component 202C then identifies the destination virtual address as virtual address "F" (act 302), a valid virtual address of the third virtual network 201C. The lookup component 202D then accesses a record associated with the destination virtual address "F" (act 303). In this case, the lookup component 202B finds a record within the internal address routing information 204C ("Internal" in decision block 304), which corresponds to the target virtual node 212C. The internal routing logic 203C is then used to route the message to the target virtual node (act 305) as represented by arrow 224.

The target virtual node 212C receives and processes the message to generate a reply. The reply is communicated back to the source virtual node 211A using the final three instance of the method 300. In this case, however, the message is the reply to the original message.

The fourth instance of the performance of the method 300 will now be described with respect to FIG. 2 and arrows 224 and 225. The virtual network that performs the method 300 is the third virtual network 201C. The lookup component 202C receives the reply message from the target virtual node 212C as represented by arrow 225 (act 301). The lookup component 202C then identifies the destination virtual address as virtual address "E" (act 302). Recall that the original message was modified such that replies to the message would send to the virtual address "E", a valid address of the third virtual network 201C. The lookup component 202C then accesses a record associated with the destination virtual address "E" (act 303). In this case, the record is in the external routing information 204C ("External" in decision block 304), and determines that the virtual address "E" is mapped to the "virtual address "C", a valid virtual address in the second virtual network 201B. The external routing logic 206C modifies the message (act 306) so as to be dispatched towards the virtual address "C" (act 307) as represented by then arrow 226.

The fifth instance of the performance of the method 300 will now be described with respect to FIG. 2 and arrow 227. In this case, the second virtual network 201B performs the method 300. The lookup component 202B receives the reply message to be delivered (act 301) as represented by arrow 226. The lookup component 202B then identifies the destination virtual address as virtual address "C" (act 302), a valid virtual address of the second virtual network 201B. The lookup component 202B then accesses a record associated with the destination virtual address "C" (act 303). In this case, the lookup component 202B finds a record within the external routing information ("External" in decision block 304), which is mapped to a virtual address "A", a valid first address in the first virtual network 201A, and which happens to be the virtual address of the source virtual node 211A of the original message. The external routing logic 206B modifies the message (act 306) so as to be dispatched towards the virtual address "A" (act 307) as represented by the arrow 227.

The sixth and last instance of the performance of the method 300 will now be described with respect to FIG. 2 and arrow 228. In this case, the first virtual network 201A performs the method 300. The lookup component 202A receives the reply message to be delivered (act 301) as represented by arrow 227. The lookup component 202A then identifies the destination virtual address as virtual address "A" (act 302), a valid virtual address of the first virtual network 201A. The lookup component 202A then accesses a record associated with the destination virtual address "A" (act 303). In this case, the lookup component 202A finds a record within the internal address routing information 204A ("Internal" in decision block 304), which corresponds to the source virtual node 211A. The internal routing logic 203A is then used to route the message to the source virtual node (act 305) as represented by arrow 228.

Accordingly, a mechanism has been described herein wherein virtual nodes may communicate outside of virtual networks without the use of a gateway. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
   one or more processors; and
   one or more computer readable storage media having stored thereon computer-executable instructions that are executable by the one or more processors to cause the computer system to route messages from a first virtual network to a second virtual network without the use of a gateway, the computer-executable instructions including instructions that are executable to cause the computer system to perform at least the following:
   identify, for the first virtual network, a destination for a message;
   access, for first virtual network, a record associated with the destination virtual network, the record identifying at least one virtual address assigned to at least one virtual node in the first virtual network and at least one virtual address assigned to at least one virtual node in the second virtual network, wherein the at least one virtual address assigned to the at least one virtual node in the second virtual network is reachable by the first virtual network without the use of the gateway;
   determine, for the first virtual network and from the record, that the message destination is mapped to a virtual address associated with a virtual node of the second virtual network; and
   route the message towards the virtual address of the second virtual network.

2. The computer system in accordance with claim 1, wherein the computer-executable instructions also include instructions that are executable to cause the computer system to:
   identify the destination for the message based on identifying a uniform resource locator of the destination of the message; and
   access the record associated with the destination virtual message based on accessing an entry for the uniform resource locator within a domain name server external to the first virtual network,
   wherein the entry maps the uniform resource locator to the virtual address of the second virtual network.

3. The computer system in accordance with claim 1, wherein the record associated with the destination virtual network includes including at least two separate tables, the at least two separate tables including an internal address routing information table and an external address routing information table.

4. The computer system in accordance with claim 1, wherein, after routing the message towards the virtual address of the second virtual network, the second virtual network handles a reply to the message by sending the reply to the virtual address of the second virtual network.

5. The computer system in accordance with claim 3, wherein the reply is routed towards a virtual node in the first virtual network that transmitted the message.

6. The computer system in accordance with claim 1, wherein the virtual address of the second virtual network is assigned to a virtual node of the second virtual network.

7. The computer system in accordance with claim 1, wherein the virtual address of the second virtual network is an invalid virtual address for the first virtual network.

8. A method, implemented at a computer system that includes one or more processors, for routing messages from a first virtual network to a second virtual network without the use of a gateway, the method comprising:
   identifying, for the first virtual network, a destination for a message;

accessing, for first virtual network, a record associated with the destination virtual network, the record identifying at least one virtual address assigned to at least one virtual node in the first virtual network and at least one virtual address assigned to at least one virtual node in the second virtual network, wherein the at least one virtual address assigned to the at least one virtual node in the second virtual network is reachable by the first virtual network without the use of the gateway;

determining, for the first virtual network and from the record, that the message destination is mapped to a virtual address associated with a virtual node of the second virtual network; and routing the message towards the virtual address of the second virtual network.

9. The method in accordance with claim 8, further comprising:

identifying the destination for the message based on identifying a uniform resource locator of the destination of the message; and accessing the record associated with the destination virtual message based on accessing an entry for the uniform resource locator within a domain name server external to the first virtual network, wherein the entry maps the uniform resource locator to the virtual address of the second virtual network.

10. The method in accordance with claim 8, wherein the record associated with the destination virtual network includes including at least two separate tables, the at least two separate tables including an internal address routing information table and an external address routing information table.

11. The method in accordance with claim 8, wherein, after routing the message towards the virtual address of the second virtual network, the second virtual network handles a reply to the message by sending the reply to the virtual address of the second virtual network.

12. The method in accordance with claim 11, wherein the reply is routed towards a virtual node in the first virtual network that transmitted the message.

13. The method in accordance with claim 8, wherein the virtual address of the second virtual network is assigned to a virtual node of the second virtual network.

14. The method in accordance with claim 8, wherein the virtual address of the second virtual network is an invalid virtual address for the first virtual network.

15. A computer program product comprising one or more hardware storage devices having stored thereon computer-executable instructions that are executable by one or more processors to cause a computer system to route messages from a first virtual network to a second virtual network without the use of a gateway, the computer-executable instructions including instructions that are executable to cause the computer system to perform at least the following:

identify, for the first virtual network, a destination for a message;

access, for first virtual network, a record associated with the destination virtual network, the record identifying at least one virtual address assigned to at least one virtual node in the first virtual network and at least one virtual address assigned to at least one virtual node in the second virtual network, wherein the at least one virtual address assigned to the at least one virtual node in the second virtual network is reachable by the first virtual network without the use of the gateway;

determine, for the first virtual network and from the record, that the message destination is mapped to the virtual address associated with the at least one virtual node in the second virtual network; and route the message towards the virtual address of the second virtual network.

16. The computer program product in accordance with claim 15, wherein the computer-executable instructions also include instructions that are executable to cause the computer system to:

identify the destination for the message based on identifying a uniform resource locator of the destination of the message; and access the record associated with the destination virtual message based on accessing an entry for the uniform resource locator within a domain name server external to the first virtual network, wherein the entry maps the uniform resource locator to the virtual address of the second virtual network.

17. The computer program product in accordance with claim 15, wherein the record associated with the destination virtual network includes including at least two separate tables, the at least two separate tables including an internal address routing information table and an external address routing information table.

18. The computer program product in accordance with claim 15, wherein, after routing the message towards the virtual address of the second virtual network, the second virtual network handles a reply to the message by sending the reply to the virtual address of the second virtual network.

19. The computer program product in accordance with claim 18, wherein the reply is routed towards a virtual node in the first virtual network that transmitted the message.

20. The computer program product in accordance with claim 15, wherein the virtual address of the second virtual network is assigned to a virtual node of the second virtual network.

* * * * *